United States Patent [19]
Ng

[11] Patent Number: 6,077,314
[45] Date of Patent: *Jun. 20, 2000

[54] METHOD OF, SYSTEM FOR, AND COMPUTER PROGRAM PRODUCT FOR PROVIDING IMPROVED CODE MOTION AND CODE REDUNDANCY REMOVAL USING EXTENDED GLOBAL VALUE NUMBERING

[75] Inventor: John Shek-Luen Ng, San Jose, Calif.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/568,079

[22] Filed: Dec. 6, 1995

[51] Int. Cl.$^7$ ...................................................... G06F 9/45
[52] U.S. Cl. ...................................................... 717/9; 717/8
[58] Field of Search .................................... 395/709, 708, 395/707, 701–706

[56] References Cited

U.S. PATENT DOCUMENTS

| | | | |
|---|---|---|---|
| 4,642,764 | 2/1987 | Auslander et al. | 364/300 |
| 5,327,561 | 7/1994 | Choi et al. | 395/700 |
| 5,448,737 | 9/1995 | Burke et al. | 395/700 |
| 5,790,867 | 8/1998 | Schmidt et al. | 395/709 |

OTHER PUBLICATIONS

E. Morel and C. Renvoise, "Global Optimization by Suppression of Partial Redundancies", Communications of the ACM, vol. 22, No. 2, Feb. 1979, pp. 96–103.

B. Rosen, M. Wegman, and F.K. Zadeck, "Global Value Numbers and Redundant Computations", Fifteenth ACM Principles of Programming Languages Symposium, Jan. 1988, San Diego, CA., pp. 12–27.

R. Cyton and J. Ferrante, "An Efficient Method for Computing Static Single Assignment Form", Sixteenth Annual ACM Symposium on Principles of Programming Languages Symposium, pp. 25–35, Jan. 1989. Also published as "Efficiently Computing Static Single Assignment Form and the Control Dependence Graph", RC 14756, 7/10/89, IBM Research Report.

B. Alpern, N. Wegman, and F.K. Zadeck, "Detecting Equality of Values in Programs", Conf. Rec. Fifteenth ACM Symposium on Principles of Programming Languages Symposium, pp. 1–11, Jan. 1988.

A. V. Aho, R. Sethi, J.D. Ullman, "Compilers Principles, Techniques, and Tools", Addison Wesley, pp. 292–293, 528–533, 634–636, 709.

J. Choi, R. Cytron, J. Ferrnate, "On the Efficientl Engineering of Ambitious Program Analysis", IEEE Trans. Software Eng. vol. 20, No. 2, pp. 105–114.

Takimoto, Munehiro, (English Translation), Efficient Partial Redundancy Elimination Based Upon Phi–Function Motion, pp. 1–26, Jan. 1995.

C. Click, "Global Code Motion / Global Value Numbering", ACM SIGPLAN, vol. 30, No. 6, pp. 246–257, Jun. 1995.

*Primary Examiner*—Alvin E. Oberley
*Assistant Examiner*—Sue Lao
*Attorney, Agent, or Firm*—Gates & Cooper

[57] ABSTRACT

Code motion and redundancy removal based on an Extended Global Value Numbering technique which performs value numbering beyond basic blocks and extended basic blocks. Full redundancies and partial redundancies are identified and iteratively processed until they are no longer movable or removable in the program. The identification and processing is aided by the use of Value Number Lists and Value Number Sets. Provides improved optimization of redundancy and partial redundancy with reduced compilation time and reduced storage.

9 Claims, 10 Drawing Sheets

METHOD OF, SYSTEM FOR, AND COMPUTER PROGRAM PRODUCT FOR PROVIDING IMPROVED CODE MOTION AND CODE REDUNDANCY REMOVAL USING EXTENDED GLOBAL VALUE NUMBERING

CROSS-REFERENCE TO RELATED APPLICATIONS

Application Ser. No. 08/568,075, filed concurrently herewith on Dec. 6, 1995 for A Method of, System for, and Computer Program Product for Providing Global Value Numbering (IBM Docket ST9-95-062), currently co-pending, and assigned to the same assignee as the present invention; and Application Ser. No. 08/568,216, filed concurrently herewith on Dec. 6, 1995 for A Method of, System for, and Computer Program Product for Providing Extended Global Value Numbering (IBM Docket ST9-95-061), currently co-pending, and assigned to the same assignee as the present invention.

The foregoing copending applications are incorporated herein by reference.

A portion of the Disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates generally to optimizing compilers for development of computer programs for use on a computer, and more particularly to code motion and code redundancy removal.

2. Description of the Related Art

A problem addressed by the optimizing compiler prior art is redundancy. Redundancy may take two forms. An expression is redundant, also known as full redundancy, if the expression has been evaluated before in a program on all paths leading to the expression. An expression is partially redundancy if the expression has been evaluated before in a program on some, but not all paths, leading to the expression. An objective of an optimizing compiler relative to redundancy is to remove the redundant expression so that it is not executed, thus saving memory which would otherwise store the redundant expression and saving execution time which would otherwise be used to execute the redundant expression. The objective relative to a partial redundancy is to move the expression so that it is no longer partially redundant.

Redundancy optimization may be understood by reference to the optimizing compiler art. FIG. 1 illustrates a procedure for translating a program 10 to create an executable binary object program 12. A lexical/syntax analysis 14 is conducted to transform source program 10 to a first intermediate language program 16. First intermediate language program 16 is then processed by an optimization routine 18 to create a second intermediate language program 20, which is then directly interpreted by the code generation routine 22 to create object program 12.

Optimization routine 18 is illustrated in FIG. 2 as it is understood in the art. Optimization processing is achieved by first performing a control flow analysis in routine 24 of first intermediate language 16. Control flow analysis routine 24 provides the control flow data 26, which are then passed to a data-flow analysis routine 28 wherein first intermediate language program 16 is analyzed for data flow. Data-flow analysis routine 28 produces the data-flow data 30. Finally, a program transformation procedure 32 accepts control flow data 26, data-flow data 30, and first intermediate language program 16 to produce second intermediate language program 20. Optimization routine 18 may include prior techniques for redundancy optimization using the control flow data 26 and the data-flow data 30 to enable the program transformation procedure 32 to perform redundancy optimization.

Many methods for redundancy optimization are known in the art. For instance, in Morel et al. (E. Morel and C. Renvoise, "Global Optimization by Suppression of Partial Redundancies", Communications of the ACM, vol. 22, no. 2, February 1979, p. 96–103) redundancy suppression and moving is accomplished by iteratively solving simultaneous Boolean systems in which each basic block and each expression within a basic block are assigned Boolean properties. Intra-basic block or local Boolean assigned properties include transparency, local availability, and local anticipability. Corresponding inter-basic block or global Boolean properties are also assigned. Morel et al. suggests that the average number of iterations to solve such simultaneous Boolean systems is 4.75 iterations, and as low as three iterations for well-structured programs. However, the teachings of Morel et al. only suppress and move redundancies that are lexically the same.

In Rosen et al. (B. Rosen, M. Wegman, and K. Zadeck, "Global Value Numbers and Redundant Computations", Fifteenth ACM Principles of Programming Languages Symposium, Jan. 12–27, 1988, San Diego, Calif.), a program is translated into Static Single Assignment Form (SSA). See Cytron et al. (R. Cytron and J. Ferrante, "An Efficient Method for Computing Static Single Assignment Form", Sixteenth Annual ACM Symposium on Principles of Programming Languages Symposium, Jan. 25–35, 1989). All expressions are attempted to be moved upwards. Value numbering is then performed locally in basic blocks. Redundancy or partial redundancy is discovered after expressions are attempted to be moved. Although the technique of Rosen et al. may identify redundancies based on the same value number in addition to those that are lexically the same, it does so by attempting to move and scanning all expressions.

Alpern et al. (B. Alpern, N. Wegman, and F. Zadeck, "Detecting Equality of Values in Programs", Conf. Rec. Fifteenth ACM Symposium on Principles of Programming Languages Symposium, Jan. 1–11, 1988) teach representing the symbolic execution of a program as a finite state machine and applying a partitioning technique to minimize the finite state machine in order to detect an equivalence of variables in the program. Although this technique is computational intensive, Alpern et al. suggest that the problem of detecting the equivalence of variables in the program is undecidable.

Thus, practitioners in the art generally employ computationally intensive techniques for code motion and code redundancy removal, and there is an accordingly clearly-felt need in the art for more efficient compiling procedures providing code motion and code redundancy removal at a reasonable compile-time cost.

SUMMARY OF THE INVENTION

The invention disclosed herein comprises a method of, system for, and computer program product for providing code motion and code redundancy removal based on an Extended Global Value Numbering technique which performs value numbering beyond basic blocks and extended basic blocks. Full redundancies and partial redundancies are identified and iteratively processed until they are no longer movable or removable in the program. The identification and processing is aided by the use of Value Number Lists and Value Number Sets. The present invention provides improved optimization of redundancy and partial redundancy with reduced compilation time and reduced storage.

In one aspect of the present invention, a fast and efficient technique for performing global value numbering based on Static Single Assignment Form (SSA) is provided.

In yet another aspect of the present invention, a new technique for performing code motion and redundancy removal is provided.

The present invention has the advantage of providing improved compilation optimization.

The present invention has the further advantage of improved optimization of redundancy.

The present invention has the further advantage of improved optimization of partial redundancy.

The present invention has the further advantage of improved optimization of loop invariants.

The present invention has the further advantage of improved optimization with reduced compilation time.

The present invention has the further advantage of improved optimization with reduced storage.

BRIEF DESCRIPTION OF THE DRAWINGS

For a more complete understanding of the present invention and the advantages thereof, reference is now made to the Detailed Description in conjunction with the attached Drawings, in which.

DESCRIPTION OF THE PREFERRED EMBODIMENT

Referring now to FIG. 3 through FIG. 9, flowcharts illustrating operations preferred in carrying out the present invention are shown. In the flowcharts, the graphical conventions of a diamond for a test or decision and a rectangle for a process or function are used. These conventions are well understood by those skilled in the art, and the flowcharts are sufficient to enable one of ordinary skill to write code in any suitable computer programming language.

Code Motion and Redundancy Removal

Code motion and redundancy removal by the present invention may be performed by the following steps:

Identify invariants per loop level. This may be performed as a part of induction variable analysis using techniques well known by those skilled in the art, such as the technique of finding invariants by using Static Single Assignment (SSA) definition links and propagating invariant properties of each variable in a loop nest.

Perform extended value numbering to identify expressions that are candidates for redundancy removal. This is discussed in greater detail below in the Section entitled "Extended Global Value Numbering".

Mark expressions as redundant or partially redundant. This is discussed in greater detail below in the Section entitled "Determining Redundancy".

Process each basic block in topological order
  Walk all expressions within the basic block,
  a. if an expression is redundant, delete it and do text substitution.
  b. If it is marked as invariant, then in general, for t=b+c, it may be moved to the loop preheader if a "safe" optimization option is used and the block dominates the loop-exit or it exists on all paths. This safe condition is relaxed for "unsafe" optimization. This is discussed in greater detail below in the Section entitled "Moving Invariants". The renaming in SSA form makes code motion easier. If the expression is moved to the loop preheader, it is checked to determine if the same expression exists within the loop. If it does, then it is deleted.
  c. If an expression is marked as partially redundant, then it is checked to determine if it may be moved. Some searches are needed to find this out. If it can be moved, the expression is moved upwards and links are updated. This is discussed in greater detail below in the Section entitled "Moving Partial Redundancies".
  d. Perform subsumption.
  e. Perform store motion. Although both subsumption and store motion may be performed by techniques well known to those skilled in the art, these steps are included here to fully disclose the type and order of various optimizations of the inventor's complete preferred embodiment of the present invention.

Figure 1:
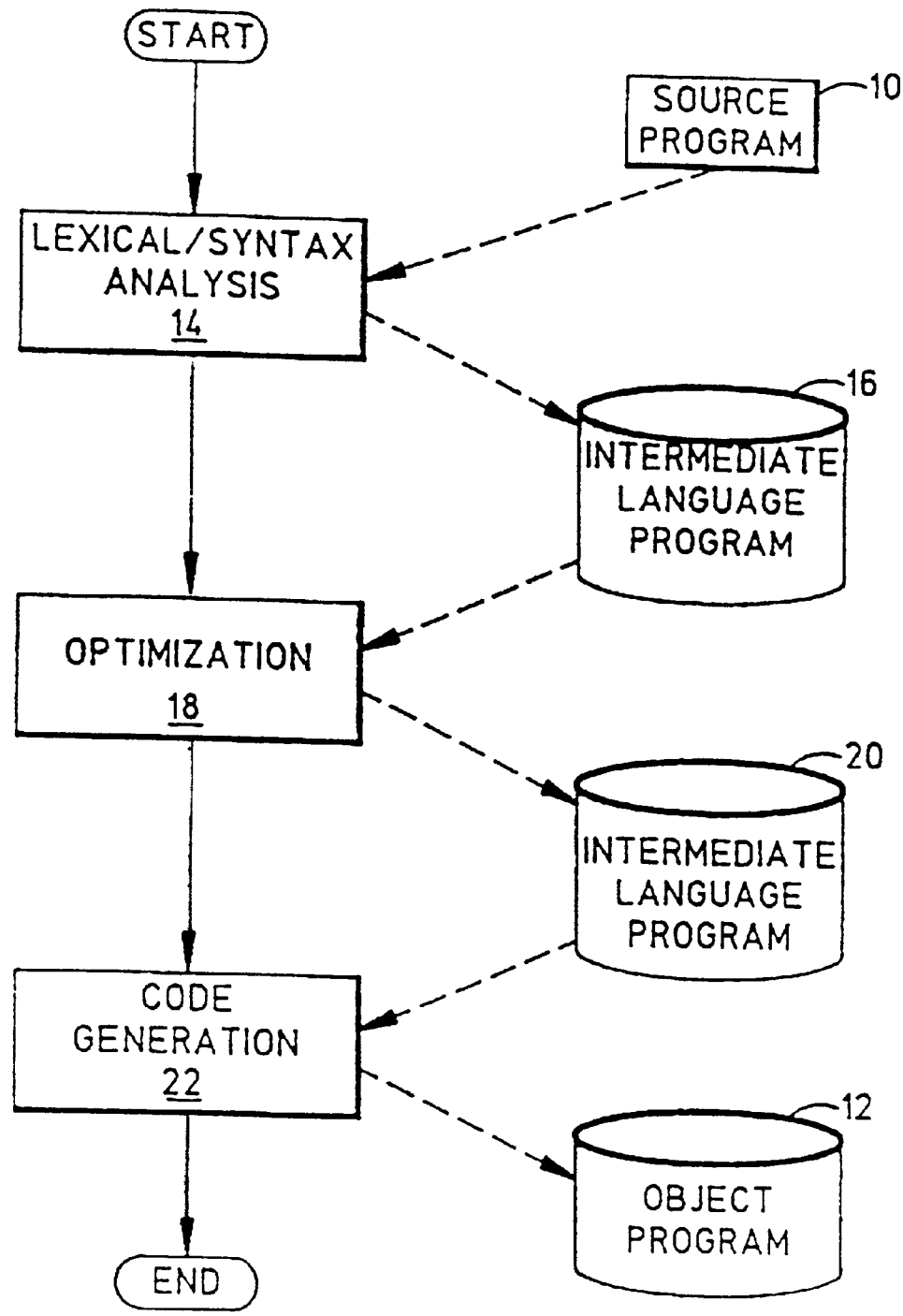
FIG. 1 shows a functional block diagram of an exemplary compiling method from the prior art.
Figure 2:
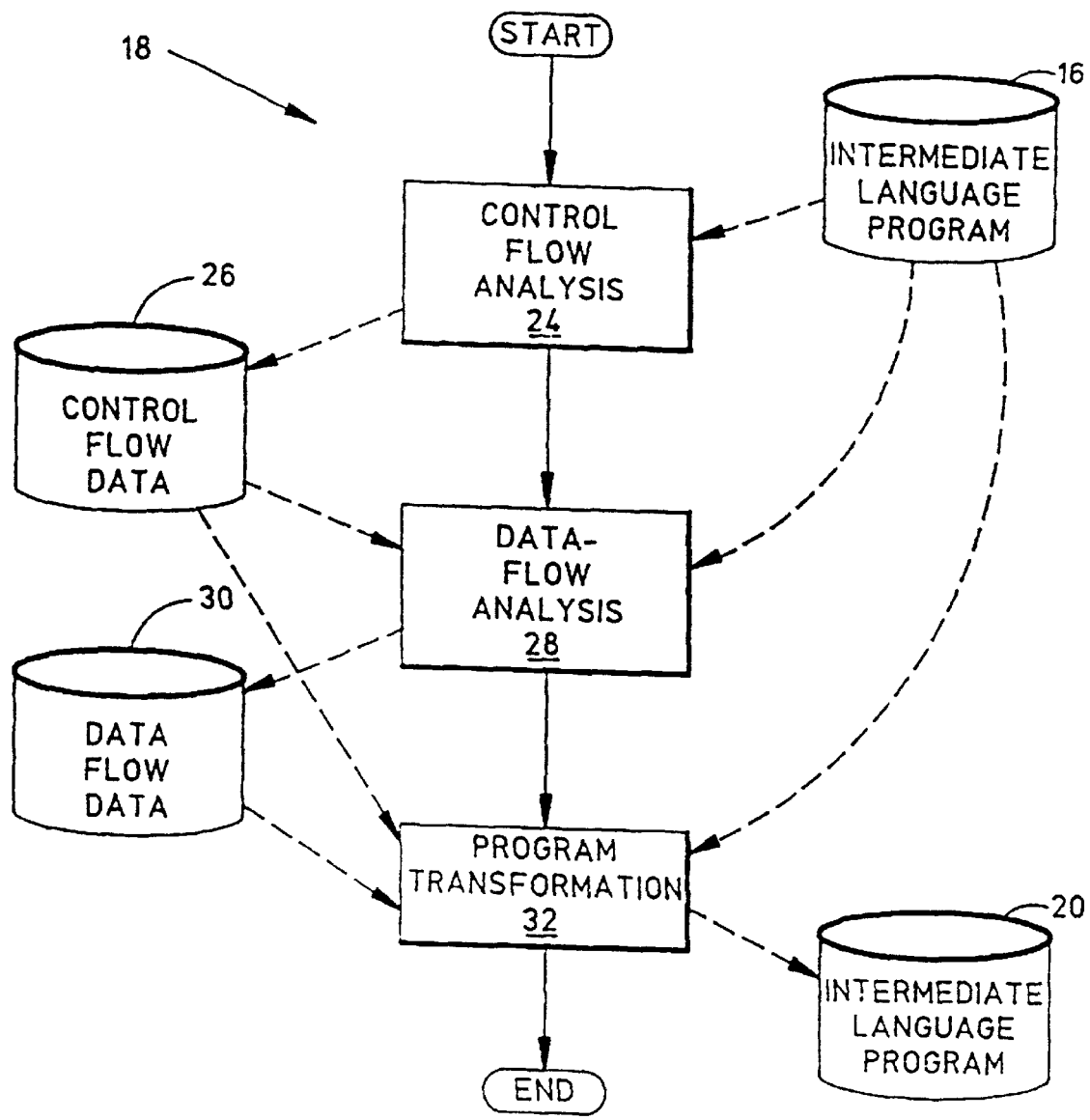
FIG. 2 shows a functional block diagram of an exemplary compiling optimization method from the prior art.
Figure 3:
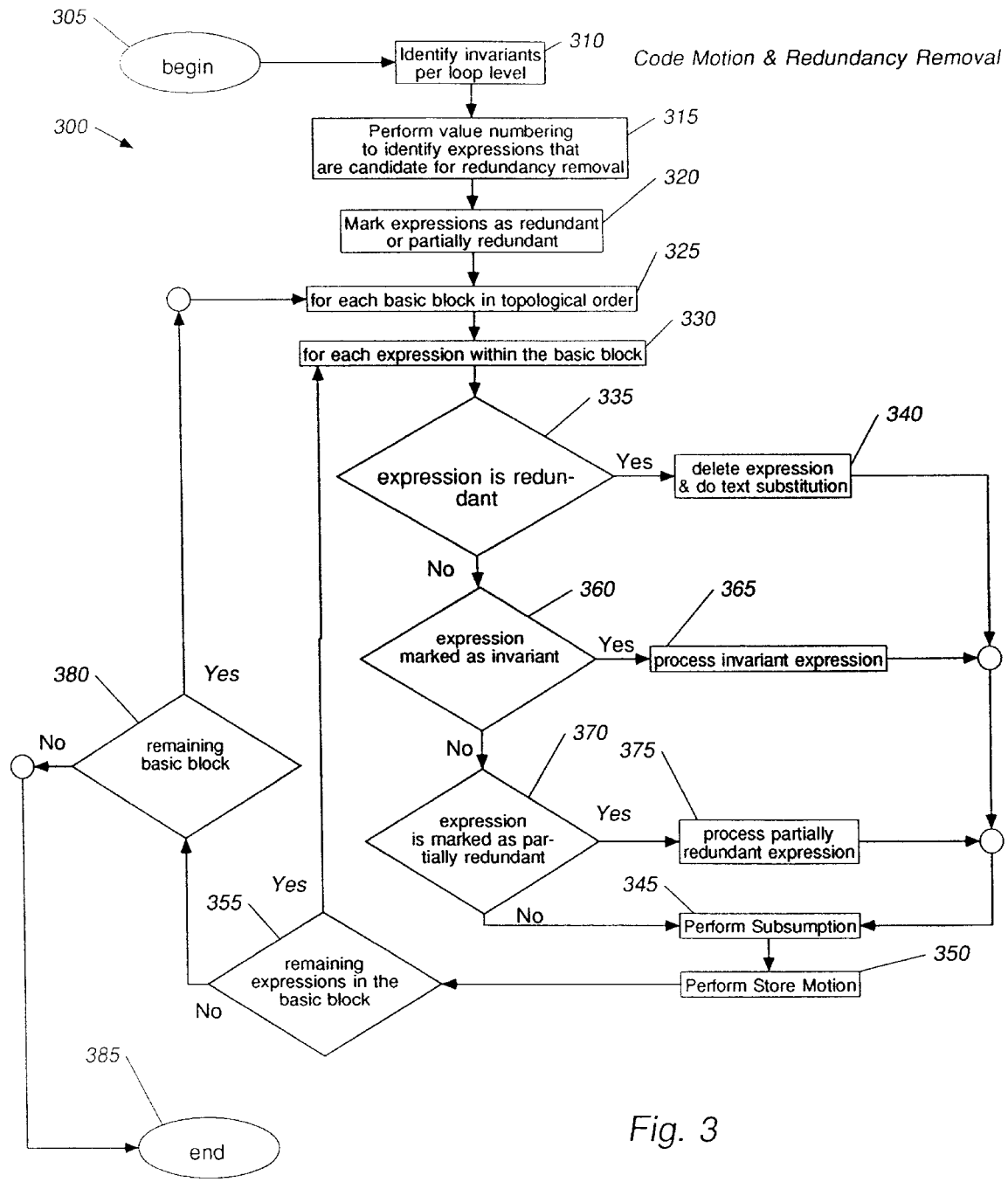
FIG. 3 is a flowchart illustrating the operations preferred in carrying out Code Motion and Redundancy Removal in accordance with the present invention.

Referring now to FIG. 3, the operations preferred in carrying out Code Motion and Redundancy Removal 300 in accordance with the present invention are illustrated. The process begins at process block 305. Thereafter, process block 310 identifies invariants per loop level. Thereafter, process block 315 performs value numbering to identify expressions that are candidate for redundancy removal. Thereafter, process block 320 marks expressions as redundant or partially redundant. Thereafter, process block 325 begins a loop for each basic block in topological order. Thereafter, process block 330 begins a loop for each expression within the basic block. Thereafter, decision block 335 determines if the expression is redundant. If the expression is redundant, then process block 340 deletes the expression and performs text substitution. Thereafter, process block 345 performs subsumption. Thereafter, process block 350 performs store motion. Thereafter, decision block 355 determines if there are remaining expressions in the basic block. If there are remaining expressions in the basic block, then processing loops back to process block 330, the start of the loop for each expression within the basic block, to process the next expression within the basic block.

Returning now to decision block 335, if the expression is not redundant, then decision block 360 determines if the expression is marked as invariant. If the expression is marked as invariant, then process block 365 processes the invariant expression. Thereafter, processing continues to process block 345 for the performance of subsumption.

Returning now to decision block 360, if the expression is not marked as invariant, then decision block 370 determines if the expression is marked as partially redundant. If the expression is marked as partially redundant, then process block 375 processes the partially redundant expression. Thereafter, processing continues to process block 345 for the performance of subsumption.

Returning now to decision block 370, if the expression is not marked as partially redundant, then processing continues to process block 345 for the performance of subsumption.

Returning now to decision block 355, if there are no remaining expressions in the basic block, then decision block 380 determines if there is a remaining basic block to be processed by the loop. If there is a remaining basic block, then processing loops back to process block 325, the start of the loop for each basic block, to process the next basic block.

Returning now to decision block 380, if there is no remaining basic block to be processed by the loop, then the process ends at process block 385.

Extended Global Value Numbering

In order to perform the optimization that removes redundant expressions, the concept of value numbers and the method for value numbering are extended. A value number in the prior art is a symbolic execution of a basic block of code, in which all variables entering that basic block of code (straight line code) are given distinct symbolic values or value numbers. The technique of value numbering is used for common subexpression elimination within a basic block, where if a symbolic value is computed twice within the same basic block, then it may be eliminated the second time. However, use of the prior art value number techniques are limited to a single basic block or an extended basic block (two adjacent basic blocks). The prior art techniques do not provide optimizations such as common subexpression elimination or redundancy removal beyond basic blocks and extended basic blocks to an entire program consisting of multiple extended basic blocks.

The Extended Global Value Numbering of the present invention is performed by walking the basic blocks of the program in topological order and assigning value numbers to expressions. With the back edges ignored in the flow-graph, the postorder (left-right-root) traversal gives reverse topological order.

Figure 6:
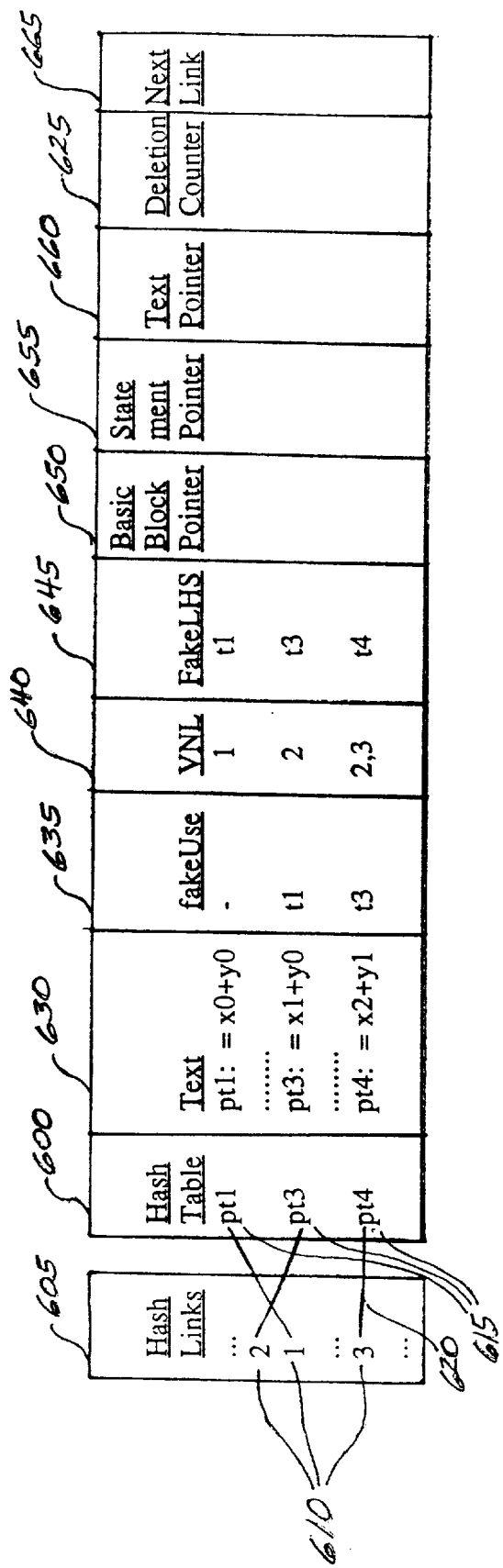
FIG. 6 is a functional block diagram of a Hash Table and associated tables in accordance with the present invention.

A hash table, illustrated in FIG. 6 and described below in the section entitled "Hash Table", is used for fast access in Extended Global Value Numbering. This hash table reduces the search time and space needed later for redundancy removal. This hash table also enables the searches to be done with "context" and in a predictive manner, as opposed to conventional methods in which all expressions were attempted to be moved upwards.

In order to properly handle redundancies, $\phi$-functions need special handling. A $\phi$-function (phi-function) is a pseudo-assignment resulting from a translation to Static Single Assignment (SSA) form. This translation to SSA form separates each variable, x, in a program into several variables xi (i.e., x0, x1, x2, . . . ) where each x; has only one assignment, hence the name Static Single Assignment. These pseudo-assignments are of the form x=$\phi$(y,z) meaning that if the control flow of the program reaches the O-function by a first control path, then x is assigned the value y, and if by a second control path, then x is assigned the value z. The target of a $\phi$-function assumes the value numbers of its operands. In particular, the following Table A shows an Example (a) in which the target, x2, of the $\phi$-function, $\phi$(x0,x1), assumes both values, 9 or 11, of its operands, x0 and x1. Later hashing for x2+y0 obtains two different values for x0+y0 and x1+y0, respectively.

TABLE A

Value Numbering
An expression may receive more than one value number.

Example a:

```
            = x0 + y0;         VN for x0+y0 = 10, VN for x0 = 9
    if ( ) then
            = x0 + y0;         VN for x0+y0 = 10
    else do;
        x =                    VN for x1 = 11
            = x1 + y0;         VN for x1+y0: 12
    end;
    x2 = φ(x0,x1);             VN for x2 = 9 or 11
       = x2 + y0;              VN for x2+y0 = 10 or 12
x2+y0 is redundant here since it receives both VN 10 & 12.
```

Example b:

```
    if ( ) then                VN for x0 = 9
            = x0 + y0;         VN for x0+y0: 10
    else do;
            = x0 + y0;         VN for x0+y0: 10
        x1 =                   VN for x1: 11
    end;
    x2 = φ(x0,x1);             VN for x2 = 9,11
       = x2 + y0;              VN for x2+y0: 10,12
x2+y0 is partially redundant since it receives just VN 10
```

Example c:

```
    if ( ) then
        p0 = ; q0 = ;          VN for p0,q0 =9,10
            = p0 + q0;         VN for p0+q0: 11
    else do;
        p1 = ; q1 = ;          VN for p1,q1 =12,13
            = p1 + q1;         VN for p1+q1: 14
    end;
    p2 = φ(p0,p1);             VN for p2 = 9,12
    q2 = φ(q0,q1);             VN for q2 = 10,13
       = p2 + q2;              VN for p2+q2=p0+q0 (left path) 11
                                          p1+q1 (right path) 14
p2+q2 is redundant since it receives both VN 11,14
```

Value Number Set (VNSet)

All expressions that look lexically the same (e.g., $x_0+y_0$, $x_1+y_1$, $x_2+y_2$) together with all other expressions sharing the same value numbers with these lexically similar expressions, form a Value Number Set or VNSet. The construction of $\phi$-functions and renaming are performed on a temporary holding these expressions as a group.

Value Number List (VNList)

The Value Number List is an ordered list of value numbers of an expression. In Example (a) of Table A above, the VNList of x2 is (9,11). The VNList of x2+y0 is (10,12) in Example (a) and Example (b) of Table A. In Example (c) of Table A, the VNlist of p2+q2 is (11,14).

Extended Global Value Numbering Rules

When two expressions have the same value number and this value number is unique, the following cases are possible: one of them is either redundant, or partially redundant, or none of them is redundant.

If an expression has more than one value number, for example vn1 and vn2, and both vn1 and vn2 reach the expression, then that expression is redundant.

The Value Number List of an incoming expression is computed and compared with the Value Number List of a current expression, If the two VNlists match in value, and in order, then the expression is redundant. The VNlist of the incoming expression is evaluated from the φ-function of the temporary holding the expression. The VNList of the current expression is computed from the φ-function of the source operands.

If an expression has more than one value number, for example vn1 and vn2, and either vn1 or vn1, but not both, reaches the expression, then that expression is partially redundant.

Although the basic blocks are processed in topological order, source operands of the φ-functions may be undefined when a φ-function is processed. This is illustrated in the example of Table B below. During a first pass in topological order, the source operand x2 of the φ-function φ(x0,x2) is undefined as the source operand x2 is defined later in the topological order.

TABLE B

|  | Value Number Initial Pass | Value Number Subsequent Pass |
|---|---|---|
| do i = 1,10 |  |  |
| x1 = φ(x0,x2) | 10,undefined | 10,11 |
| = x1 + y0 | 9,12 | 9,12 |
| x2 = | 11 | 11 |
| = x2 + y0 | 12 | 12 |
| end |  |  |

Procedure for Extended Global Value Numbering

The Extended Global Value Numbering of the present invention may be performed by the following steps:

Walk basic blocks in topological order and process each expression.

Each expression (right hand side (RHS) and left hand side (LHS)) receives a value number. In SSA form, all definitions are exposed.

All other operands, which do not have a value number yet, receive a LatticeCell off $\top$ or a value number of unknown. If the expression contains an operand of unknown value, i.e., the LatticeCell equals to $\top$, then the corresponding text is put onto the worklist.

A Hash table is used to speed up the storing and retrieval of value numbers. The hash key consists of the op-code plus all its operands. This also allows varying the number of operands. For single items, such as $x_0$, $x_1$, $x_2$, $x_3$, the value number is stored in an array in the dictionary. This saves space in the hash table. In general, for $x_0+y_0$, both $x_0+y_0$ and x+y are hashed. The later x+y is the lexical item used to store all corresponding VNSets.

Since hashing is performed globally for all expressions, garbage collection allows reuse of entries in the hash table to conserve space. At the exit of the outermost loop, all expressions that are marked as variant may be removed from the hash table. This requires some copying of information from the hash table to the dictionary. The data structures are designed such that the hash table need not be referenced after the expressions are value numbered and the temporary is created. See section entitled "Hash Table" below for additional details describing how value numbers are assigned.

The procedure terminates when the worklist becomes empty. This happens when all expressions and items are assigned with a VNlist.

A text is taken off the worklist if the operands are defined already. Each time a new value number is formed, the expression is entered into the hash table.

Value numbers and value number lists are evaluated and created using the following rules:

for φ-functions:

any $\cap \top ==> \top$

If any operand of the φ-function has an unknown value number, then set the value number of the φ-function to unknown.

$VN_i \cap VN_j ==> VN_k$

If $VN_i$ not equal to $VN_j$, then a new value number is formed when the operands are involved in a recursive definition, else VNList for $VN_i$ and $VN_j$ is formed.

$VN_i \cap VN_j ==> VN_i$ if i=j

If all value numbers of φ-function operands are equal, then set φ-function value number to operand value number.

for other op-codes:

any $\cap \top ==> \top$

If any operand of has unknown value number, then set the value number to unknown.

$VN_i \cap VN_j ==> VN_k$

If value numbers are not equal, then a new value number is formed and assigned if not already assigned.

Note that i does not exist in this meet operation. The application of these rules result in assigning a value number to each expression of a first subset of the expressions; assigning an unknown value number to each expression of a second subset of the expressions; and assigning a value number list to each expression of a third subset of the expressions, wherein the value number list comprises an ordered list of value numbers assigned to the expression.

If the number of items on the worklist remains the same after a pass through it, then some φ-function operands are defined recursively in terms of one another. In this case, new value numbers are assigned to the targets of the φ-function.

Figure 4:
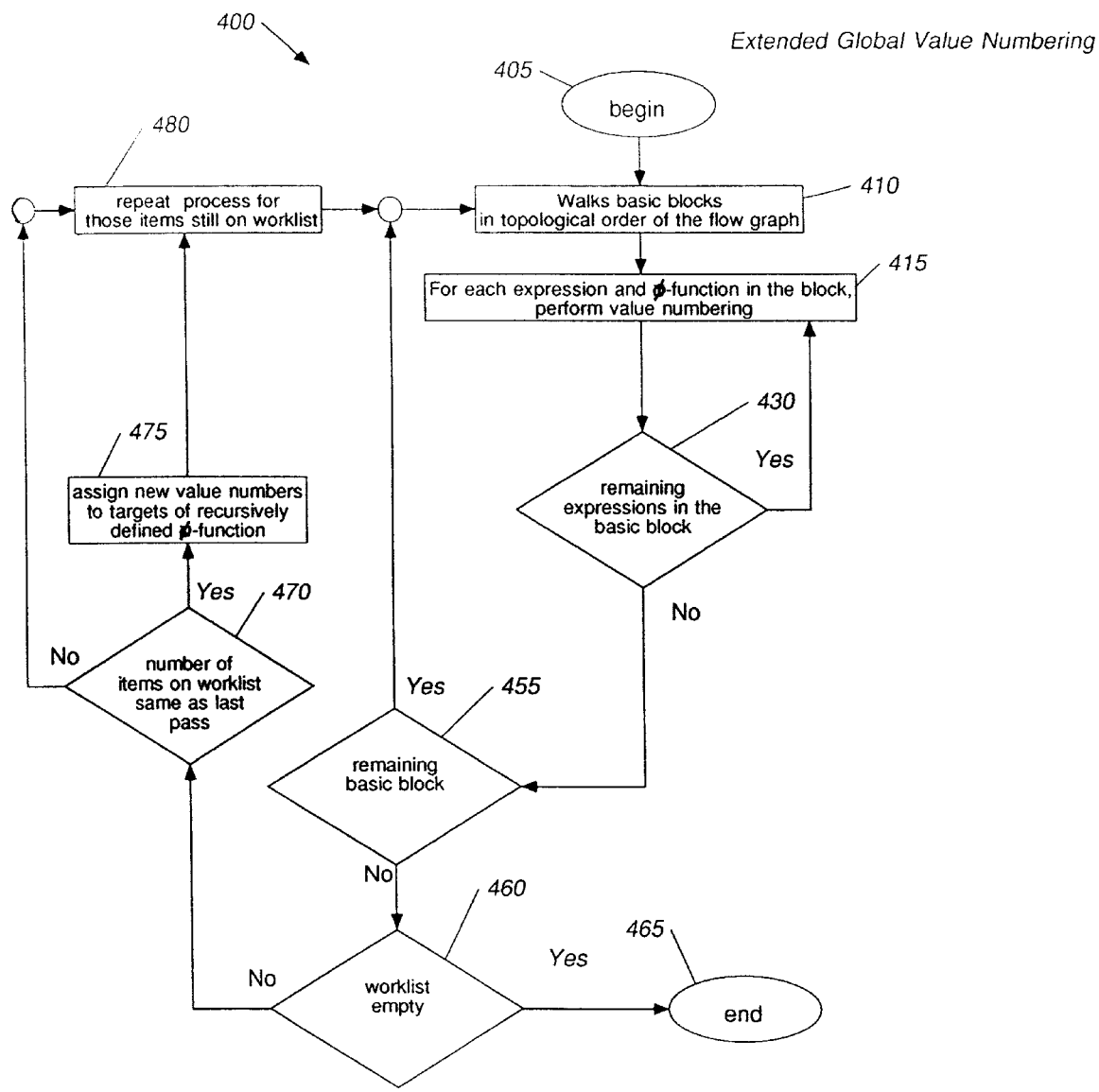
FIG. 4 and FIG. 5 are flowcharts illustrating the operations preferred in carrying out Extended Global Value Numbering in accordance with the present invention.

Referring now to FIG. 4, the operations preferred in carrying out Extended Global Value Numbering 400 are illustrated. The process begins at process block 405. Thereafter, process block 410 begins a loop that walks the basic blocks in topological order of the flow graph. Thereafter, process block 415 begins a loop for each expression and φ-function in a basic block to perform value numbering. The performance of value numbering is illustrated in greater detail in FIG. 5. Thereafter, decision block 430 determines if there are remaining expressions in the basic block to be processed. If there are remaining expressions in the basic block, then processing loops back to process block 415 to process the next expression and φ-function in the basic block.

Returning now to decision block 430, if there are no remaining expressions in the basic block to be processed, then decision block 455 determines if there are remaining basic blocks to be processed by the loop. If there are remaining basic blocks to be processed, then processsing loops back to process block 410 to process the next basic block in topological order of the flow graph.

Returning now to decision block 455, if there are no remaining basic blocks to be processed by the loop, then decision block 460 determines if the worklist is empty. If the worklist is empty, then the process ends at process block 465.

Returning now to decision block 460, if the worklist is not empty, then decision block 470 determines if the number of items on the worklist is the same as the number of items on the worklist during the last pass through the worklist. If the number of items on the worklist is the same, then process block 475 assigns new value numbers to the targets of recursively defined φ-functions. Thereafter, process block 480 reinitializes the loop starting at process block 410 to repeat the loop process for those items still on the worklist. Thereafter, processing continues to process block 410 to begin another loop to process those items still on the worklist.

Returning now to decision block 470, if the number of items on the worklist is not the same as the number of items on the worklist during the last pass through the worklist, then processing continues to process block 480 to reinitialize the loop starting at process block 410 to repeat the loop process for those items still on the worklist.

Figure 5:
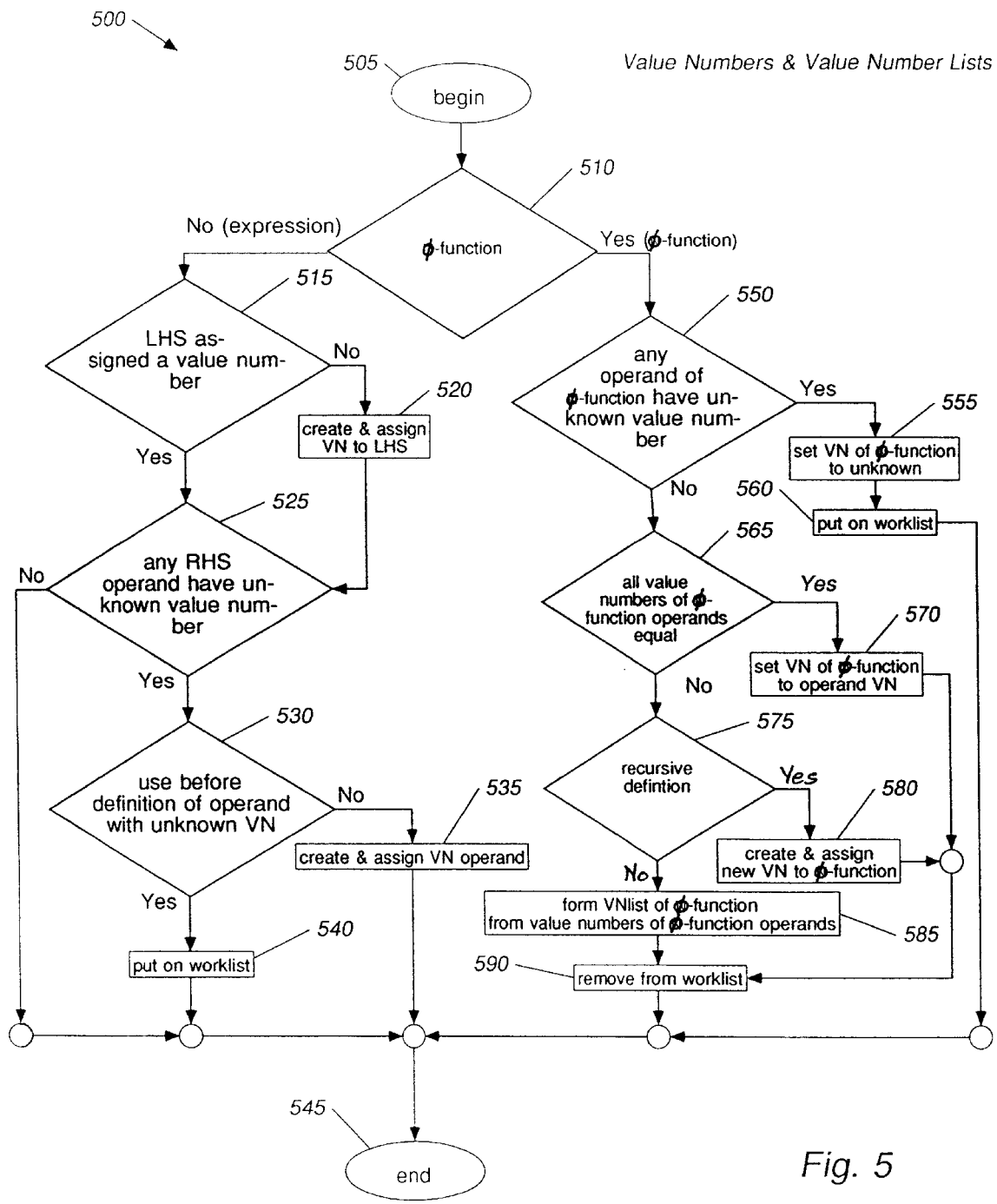

Referring now to FIG. 5, the operations preferred in carrying out the performance of value numbering of process block 415 are illustrated. The process begins at process block 505, and thereafter, decision block 510 determines if the current expression is a φ-function. If the current expression is not a φ-function, i.e., if it is an expression, then decision block 515 determines if the left hand side (LHS) of the expression has been assigned a value number. If no value number has been assigned to the LHS, then process block 520 creates and assigns a new unique value number to the LHS. Thereafter, decision block 525 determines if any right hand side (RHS) operands of the current expression have an unknown value number. If so, then decision block 530 determines if the operand with an unknown value number is a use before definition. If it is not a use before definition, then process block 535 creates and assigns a new unique value number to the operand. Process block 520 and process block 535 are portions of the processing which assign a value number to each expression of a first subset of the expressions. Thereafter, the process ends at process block 545.

Returning now to decision block 515, if a value number has been assigned to the LHS, then processing continues to decision block 525 to determine if any right hand side (RHS) operands of the current expression have an unknown value number.

Returning now to decision block 525, if any right hand side (RHS) operands of the current expression do not have an unknown value number, i.e., if all RHS operands have been assigned a value number, then the process ends at process block 545.

Returning now to decision block 530, if the operand with an unknown value number is a use before definition, then process block 540 puts the corresponding text on a worklist, and then the process ends at process block 545.

Returning now to decision block 510, if the current expression is a φ-function, then decision block 550 determines if any operand of the φ-function has an unknown value number. If any operand of the φ-function has an unknown value number, then process block 555 sets the value number of the φ-function equal to unknown. Process block 555 is that portion of the processing which assigns an unknown value number to each expression of the second subset of the expressions. Thereafter, process block 560 puts the corresponding text of the φ-function on the worklist, and then the process ends at process block 545.

Returning now to decision block 550, if no operand of the φ-function has an unknown value number, then decision block 565 determines if all of the value numbers of the φ-function operands are equal. If all of the value numbers of the φ-function operands are equal, then process block 570 sets the value number of the φ-function to the value number of the operands. Thereafter, process block 590 removes any corresponding text from the worklist, and then the process ends at process block 545.

Returning now to decision block 565, if all of the value numbers of the φ-function operands are not equal, then decision block 575 determines if the φ-function is involved in a recursive definition. If the φ-function is involved in a recursive definition, then process block 580 creates and assigns a new unique value number to the φ-function. Process block 580 is another portion of the processing which assigns a value number to each expression of a first subset of the expressions. Thereafter, processing continues to process block 590 to remove any corresponding text from the worklist.

Returning now to decision block 575, if the φ-function is not involved in a recursive definition, then process block 585 forms a value number list for the φ-function, where the value number list is an ordered list of the value numbers of the φ-function operands. Process block 585 is that portion of the processing which assigns a value number list to each expression in the third subset of the expressions. Thereafter, processing continues to process block 590 to remove any corresponding text from the worklist.

Determining Redundancy

Some expressions become redundant only after code is moved to the preheader of a loop. The following Table C show an example of such a situation. This type of redundancy may be determined by a lookup each time any code is moved.

TABLE C

| Redundancy discovered after code is moved |
|---|
| do while ( )<br>    if ( ) then<br>        do;<br>            if ( ) then z1 = x + y;<br>        end;<br>    else z2 = x + y;<br>    z3 = x + y<br>end; |

Other redundancies may be determined prior to code motion. The present invention determines redundancy prior to code motion by performing the following steps.

Construct φ-functions and Do Renaming for Expressions

For each expression in the same value number set, say x0+y0, x1+y1, x1+z1, φ-functions are constructed and renaming is performed. Techniques for the construction of φ-functions and renaming such as those of Cytron et al. are well known by those skilled in the art. The present invention extends these well known techniques by:

only introducing φ-functions for expressions at the beginning of this process;

treating each expression as a use followed by a set; and
performing redundancy removal during renaming if the use of an expression is dominated by the set of the expression.

The following Table D illustrates this extended construction of φ-functions for expressions.

TABLE D

Construct φ-functions for expressions if ( ) then a = x + y + z;
d = x + y;
Construct φ-functions. For expressions that have the same value numbers, treat it as a "Use followed by a Set". The "use" does not form a new text. It exists just as a special operand in RHS.
==>
if ( ) then do;
    = t;
    t = x + y
end;
    = t;
    t = x + y
    d = t3;

The following Table E illustrates the renaming of the operands of the constructed φ-functions.

TABLE E

Rename operands of φ-functions

After φ-functions are built, do renaming.
==>
if ( ) then do;
    = t0
    t1 = x + y
    = t1 + z
    a =
    end;
s1:  t2 = φ(t0,t1)
    = t2
s2:  t3 = x + y
    d = t3

The following Table F illustrates performing redundancy removal during renaming if the use of an expression is dominated by the set of the expression.

TABLE F

Removing Redundancy During Renaming

| = x + y + z | ==> | t1 = x + y | ==> | t1 = x + y |
| = x + y | | = t1 | | = t1 |
| = x + y | | = t1 | | |

After renaming and its redundancy removal, any source operands of φ-functions or "fake uses" which remain unnamed are undefined. This means the expression is not a candidate for redundancy removal or code motion. For these expressions, further processing determines if an expression is redundant, either fully redundant or partially redundant.

Determining Redundancy and Partial Redundancy

An expression is redundant if it is evaluated before on all paths. This redundancy occurs when:

if an expression has more than one value number, for example vn1 and vn2, and both vn1 and vn2 reach the expression, or the Value Number List of the expression matches in value, and in order, the Value Number List of another expression in its path.

An expression is partially redundant if it is evaluated before on some but not all paths. This occurs when:

the value number of an expression is vn1, and both vn1 and vn2 reach the expression; or the value numbers of the expression are vn1 and vn2, and only vn1 reaches it. All expressions that are marked as loop invariants may be regarded as partial redundancies, without any further analysis. Partial redundancy may be determined together with the redundancy determination above.

The present invention identifies redundancies and partial redundancies by performing the following:

For every "fake" use, examine its definitions, if the value of its definition is equal to the expression, then the expression is redundant. If the "fake" use has more than one value, then the definition must define all these values. As given in the examples below, the values numbers of the temporary and those of receiving expression ("fake use") are constructed and compared.

If the "fake" use has more than one value, and only one value reaches it, then it is partially redundant.

The φ-functions for the temporary and source operands may appear in different join points. When tracing the source operand backwards, if a φ-function for the source operand appears alone, then the temporary needs to be spilt too. This way the VNLists always have the same number of elements.

The tracing of the source operands in certain paths terminates when one of the following conditions is reached:

when one φ-function dominates the other;
when all φ-functions are processed;
when the temporary is reached;
when the source operand is defined; or
when the source operands define one another via φ-functions. This happens when a definition appears inside a loop.

In tracing the temporary backwards, if the temporary is defined in a loop but only in certain paths, this special pattern should be recognized and updated as shown on the right in the following Table G.

TABLE G

Temporary only defined in certain paths in a loop

| t0 = x0 +y0 | ==> | t0 = x0 + y0 |
| do i = 1,10 | | do i = 1,10 |
|   t2 = φ(t3,t0) | | |
|   if ( ) then t1 = x0 +y0 | |   if ( ) = . . t0 |
|   ... | | |
|   t3 = φ(t2,t1) | | |
| end | | end |
| | | VN for t in this path consists of one element |

Redundant expressions are updated with inter-block temporaries, and resultant spurious φ-functions are also cleaned up. Inter-block temporaries are created to hold expressions. Source operands of the φ-functions are also updated.

TABLE H

Determination of redundancy

Case (a):
    t1 = x0 + y0  vn = 10
    ...
    = t1  "fake use"
    t2 = x0 + y0  vn = 10 ==> redundant Case (b):

TABLE H-continued

Determination of redundancy w1 = x0 + y0      w2 = x1 + y0     VN = 12, 13

```
x2 = φ(x0, x1)              VN = 9, 10
w3 = φ(w1, w2)              VNList = (12, 13)
   = w3                     "fake use" 12, 13
w4 = x2 + y0                VNList = (12, 13) ==> redundant
```

Case (c):

w1 = x0 + y0      w2 = x1 + y1     VN = 20, 21

```
x2 = φ(x0, x1)              VN = 9, 10
y2 = φ(y0, y1)              VN = 11, 12
w3 = φ(w1, w2)              VN = 20, 21
   = w3                     "fake use" 20, 21
w4 = x2 + y2                Vn = x0 + y0, x1 + y1 = 20, 21
                               ==> redundant
                            Notice that Vn for w4 is
                            constructed of just two
                            combinations instead of four;
                            the values can either come in
                            from the left or from the right,
                            so x0 + y1 is an invalid
                            combination.
```

Case (d):

VN = 20    w0 = x0 + y0    w1 = x1 + y1    VN = 21

```
VN = 9, 10      x3 = φ(x0, x1)
VN = 11, 12     y3 = φ(y0, y1)
VN = 20, 21     w3 = φ(w0, w1)   w2 = x2 + y2   VN = 22 x4 = φ(x3, x2)         VNList = (9, 10, 13)
                y4 = φ(y3, y2)         VNList = (11, 12, 14)
                w4 = φ(w3, w2)         VNList = (20, 21, 22)
                   = w4                "fake use"
                w5 = x4 + y4 => x3 + y3; x2 + y2 =>
                   x0 + y0; x1 + y1; x2 + y2 =>
                   VNList = (20, 21, 22)
                   VNLists matched ==> redundancy
                                              obtained
```

TABLE I

Determination of partial redundancy w1 = x0 + y0      w2 = x1 + y0     VN = 12, 13
                  x3 =             VN = 15

```
x2 = φ(x0, x3)              VN = 9, 15
w3 = φ(w1, w2)              VN = 12, 13
   = w3                     "fake use"        12, 13
w4 = x2 + y0                VNL for x0 + y0, x3 + y0: 12, 16
                            only 12 matches => partial redundancy
```

TABLE I-continued

Determination of partial redundancy

The following case shows no redundancy:

w1 = x0 + y0      w2 = x1 + y0     VN = 12, 13
x2 =              x3 =             VN for x2, x3: 14, 15

```
x4 = φ(x2, x3)              VN = 14, 15
w3 = φ(w1, w2)              VN = 12, 13
   = w3                     "fake use"        12, 13
w4 = x4 + y0                VNL for x2 + y0, x3 + y0: 16, 17
                            nothing matches => no redundancy
```

Figure 7:
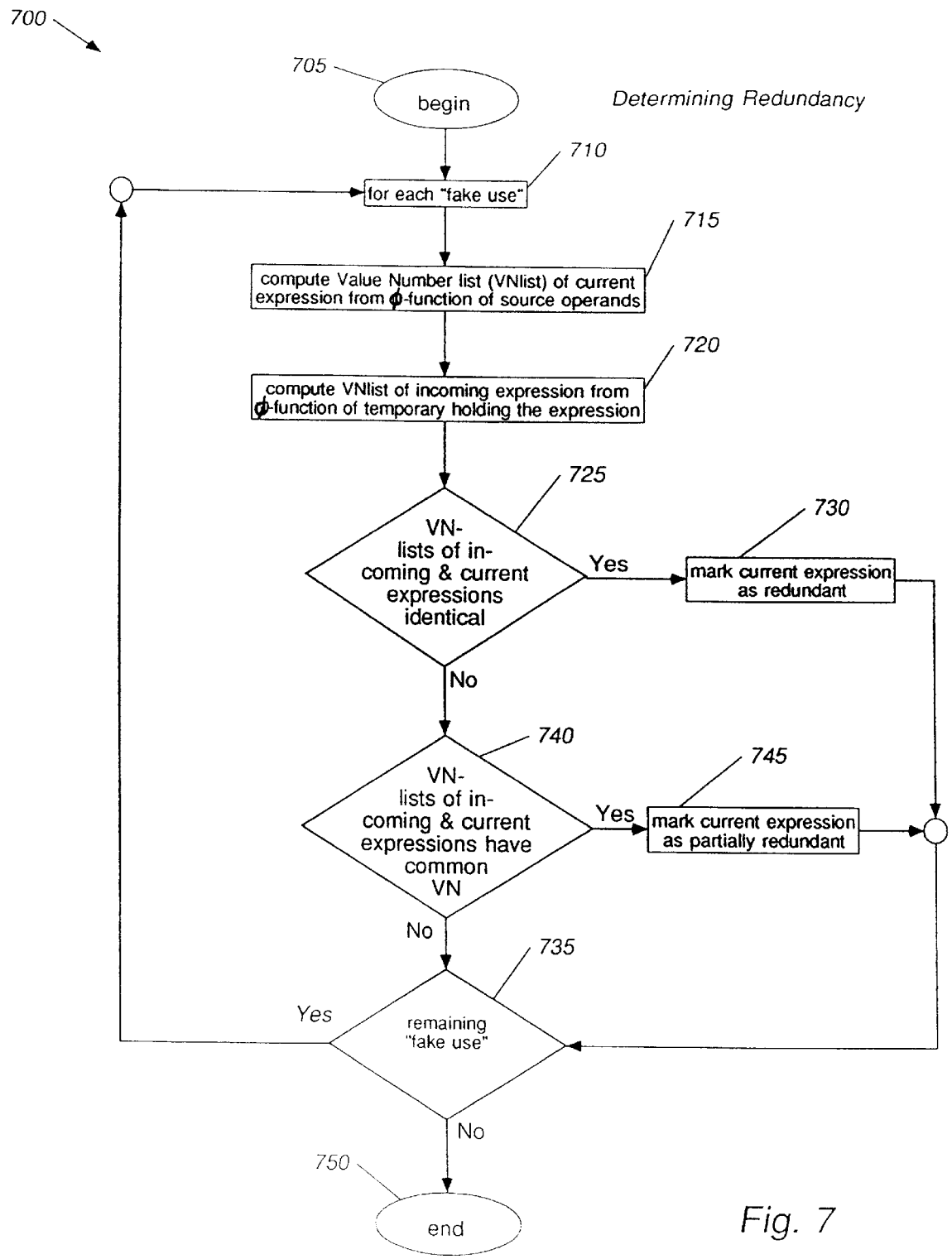
FIG. 7 is a flowchart illustrating the operations preferred in carrying out Determining Redundancy in accordance with the present invention.

Referring now to FIG. 7, operations preferred in carrying out the Determining Redundancy 700 portion of the present invention are illustrated. The process begins at process block 705. Thereafter, process block 710 begins a loop for each "fake use". Thereafter, process block 715 computes a Value Number list (VNlist) of the current expression from the φ-function of the source operands. Thereafter, process block 720 computes the VNlist of the incoming expression from the φ-function of a temporary holding the expression. Thereafter, decision block 725 determines if the VNlists of the incoming expression and the current expression are identical. If the VNlists are identical, then process block 730 marks current expression as redundant. Thereafter, decision block 735 determines if there is a remaining "fake use". If there is a remaining "fake use", then processing loops back to process block 710 to process the next "fake use".

Returning now to decision block 725, if the VNlists of the incoming expression and the current expression are not identical, then decision block 740 determines if the VNlists of the incoming expression and the current expression have a common value number. If the VNlists have a common value number, then process block 745 marks the current expression as partially redundant. Thereafter, processing continues to decision block 735 to determine if there is a remaining "fake use".

Returning now to decision block 740, if the VNlists of the incoming expression and the current expression do not have a common value number, then processing continues to decision block 735 to determine if there is a remaining "fake use".

Returning now to decision block 735, if there is not a remaining "fake use", then the processing ends at process block 750.

Moving Invariants

As mentioned earlier, expressions that are loop invariants may be regarded as partial redundancies. Loop invariants may be identified before other partial redundancies to speed up the process of moving the invariant expressions. In general, a partial redundancy is moved upwards basic block by basic block; whereas, an invariant is moved once to a loop preheader.

If "unsafe" optimization is used, then an invariant may be moved to a loop preheader, even though the invariant is not anticipated in all paths. For "safe" optimization, an invariant expression that has side effects (e.g., floating divide) may only be moved if the same invariant expression exists in all paths. For C-language expressions, an invariant expression may only be moved if the invariant expression exists in all paths independent of whether or not the invariant expression can cause side effects. If an invariant exists in a basic block that dominates a loop exit, then the invariant may always be moved. This situation is shown in Table J below. If not, a φ-function should reside at a basic block that dominates the loop exit, and all the operands of the φ-function should have the same value number.

TABLE J

Moving invariants

Since t0 = t3 and assuming t4 resides in block that dominates the loop exit, then all x + y can be moved.

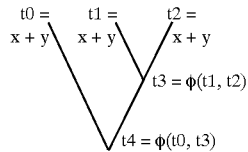

After an invariant is moved to the loop preheader, as shown in Table M, some previously processed expressions dominated by the preheader may become redundant as a result of moving the invariant. This may be determined by searching the use-definition chains.

Variables that have uses that are upwardly exposed in the loop are treated as variants. The following Table K shows such a variant with upwardly exposed usage.

TABLE K

Variant with upwardly exposed usage

```
do while
   = t
t =
end
```

Invariants without an upward exposed usage cannot be moved. The following Table L shows an example of an invariant without upward exposed usage which cannot be moved.

TABLE L

| Invariant without upwardly exposed usage | SSA Form | |
|---|---|---|
| i = 1 | i1 = 1 | |
| do while ( ) | do while ( ) | |
|   if ( ) then | | i2 <== φ(i4,i1) |
|   i = 2 | | if ( ) then |
| | |   i3 = 2 |
| end | | i4 <== φ(i3,i2) |
| = i | end | |
| | i5 <== φ(i4,i1) | |
| | = i5 | |

In the following example of Table M, all x+y are marked as invariants and as partially redundant. The first two x+y cannot be moved because it is not anticipated in all paths. The last x+y dominates the loop exit, and therefore can be moved. After it is moved, all expressions that have the same value number inside the loop can be treated as redundant.

TABLE M

Redundancy discovered after code is moved

```
do while ( )
    if ( ) then
        do;
            if ( ) then z1 = x + y;
        end;
    else z2 = x + y;
    z3 = x + y;
end;
```

Figure 8:
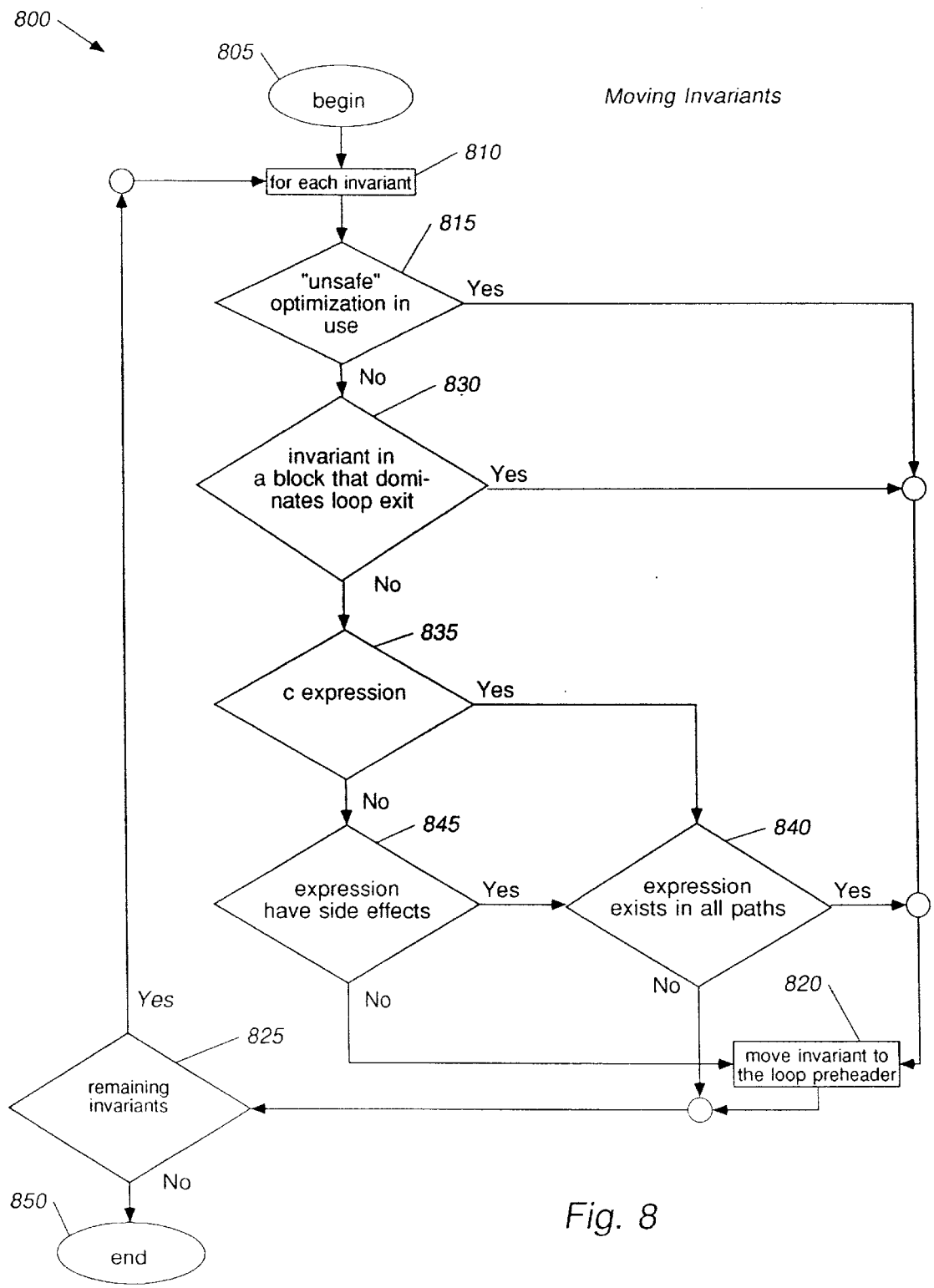
FIG. 8 is a flowchart illustrating the operations preferred in carrying out Moving Invariants in accordance with the present invention.

Referring now to FIG. 8, operations preferred in carrying out the Moving Invariant 800 portion of the present invention are illustrated. The process begins at process block 805. Thereafter, process block 810 begins a loop for each invariant. Thereafter, decision block 815 determines if "unsafe" optimization is in use. If "unsafe" optimization is in use, then process block 820 moves the invariant to the loop preheader. Thereafter, decision block 825 determines if there are remaining invariants. If there are remaining invariants, then processing loops back to process block 810 to process the next invariant.

Returning now to decision block 815, if "unsafe" optimization is not in use, then decision block 830 determines if the invariant is in a block that dominates a loop exit. If the invariant is in a block that dominates a loop exit, then processing continues to process block 820 to move the invariant to the loop preheader.

Returning now to decision block 830, if the invariant is not in a block that dominates a loop exit, then decision block 835 determines if the invariant is a C-language expression. If the invariant is a C-language expression, then decision block 840 determines if the expression exists in all paths. If the expression exists in all paths, then processing continues to process block 820 to move the invariant to the loop preheader.

Returning now to decision block 835, if the invariant is not a C-language expression, then decision block 845 determines if the expression has side effects. If the expression has side effects, then processing continues to decision block 840 to determine if the expression exists in all paths.

Returning now to decision block 845, if the expression does not have side effects, then processing continues to process block 820 to move the invariant to the loop preheader.

Returning now to decision block 840, if the expression does not exist in all paths, then processing continues to decision block 825 to determine if there are remaining invariants.

Returning now to decision block 825, if there are no remaining invariants, then the process ends at process block 850.

Moving Partial Redundancies

An expression is marked as partially redundant if the expression is computed in some, but not all, paths. A loop invariant may be regarded as a partial redundancy because the expression is computed in each iteration, except the first iteration. As shown in Example (d) of Table N below, not all partial redundancies should be moved. In general, a partial redundancy should not be moved to a basic block that has multiple successors. If it is safe to move a partial redundancy, then it is moved to a basic block preceding the definition of its φ-function.

In general, an expression that is marked as partially redundant may be moved if:

the partially redundant expression dominates one of its source operands, as shown in Example (a) of Table N below; or the φ-function below the partially redundant expression has all source operands receiving the same value number, as shown in Example (c) of Table N below.

After the partially redundant expression is moved upwards, it may still be partially redundant as shown in Example (b) of Table N below. The search repeats until the partially redundant expression is hoisted to a basic block which causes no redundancy.

Additional φ-functions for temporaries may be created after expressions are moved. This is shown in Table T.

TABLE N

Examples of partial redundancy

Example (a):
```
    if ( ) then              ===> if ( ) then
        t1 = p => q => x;            t1 = p => q => x;
    else . . . ;                  else t3 = p => q => x;
    t2 = φ(t0, t1)                t2 = φ(t3, t1)y
    t3 = p => q => x;                = t2;
```
Example (b):

$$\underset{x+y}{\bigvee\!\!\!\!\bigvee}\overset{x+y}{\phantom{x+y}} \Rightarrow \underset{}{\bigvee\!\!\!\!\bigvee}\overset{x+y\,\,\,\,x+y\,\,x+y}{\phantom{x+y}} \Rightarrow \underset{x+y}{\bigvee\!\!\!\!\bigvee}\overset{x+y\,\,x+y}{\phantom{x+y}}$$

Example (c):
```
    if ( ) t = x + y;
    if ( ) z = x + y;
    else w = x + y;
```
This partial redundancy cannot be removed Example (d):
```
    if ( ) then
            = p => q => x;
    if ( ) then
            = p => q => x;
```

Figure 9:
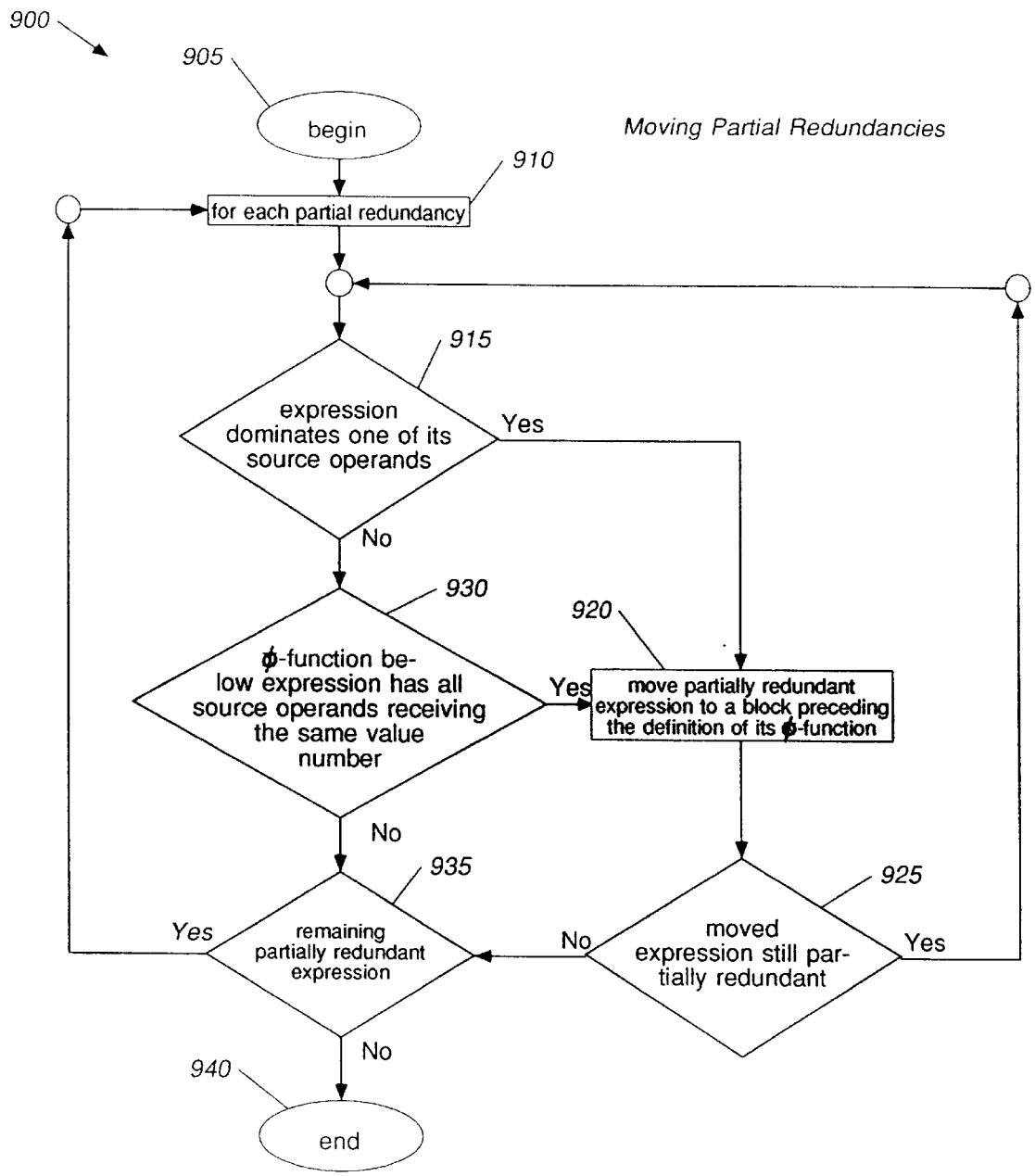
FIG. 9 is a flowchart illustrating the operations preferred in carrying out Moving Partial Redundancies in accordance with the present invention.

Referring now to FIG. 9, operations preferred in carrying out the Moving Partial Redundancies 900 portion of the present invention are illustrated. The process begins at process block 905. Thereafter, process block 910 begins a loop for each partially redundant expression. Thereafter, decision block 915 determines if the partially redundant expression dominates one of its source operands. If the partially redundant expression dominates one of its source operands, then process block 920 moves the partially redundant expression to a block preceding the definition of its φ-function. Thereafter, decision block 925 determines if the moved partially redundant expression is still partially redundant in its new location. If the moved partially redundant expression is still partially redundant in its new location, then processing loops back to decision block 915 to reprocess the still partially redundant expression.

Returning now to decision block 915, if the partially redundant expression does not dominate one of its source operands, then decision block 930 determines if a φ-function below the partially redundant expression has all source operands receiving the same value number. If a φ-function below the partially redundant expression has all source operands receiving the same value number, then processing continues to process block 920 to move the partially redundant expression to a block preceding the definition of its φ-function.

Returning now to decision block 930, if there is no φ-function below the partially redundant expression having all source operands receiving the same value number, then process block 935 determines if there is a remaining partially redundant expression. If there is a remaining partially redundant expression, then processing loops back to process block 910 to process the next partially redundant expression.

Returning now to decision block 925, if the moved partially redundant expression is not partially redundant in its new location, then processing continues to decision block 935 to determine if there is a remaining partially redundant expression.

Returning now to decision block 935, if there is no remaining partially redundant expression to be processed, then the process ends at process block 940.

Hash Table

The Hash Table holds entries of expressions. An example of a Hash Table 600 and its associated tables are shown in FIG. 6. HashLinks 605 is the table in which the keys are initially hashed. Each entry 610 contains an index to the Hash table 600. Hash Table records 615 are assigned sequentially. HashLinks indexes 620 are used wherever the keys are hashed. In general, the HashLinks index 620 to the Hash Table 600 equals to mod(value num, hash_table_size). Since Hash Table records 615 can be reused after garbage collection, in order to assure unique value numbers, the same value number cannot be used again the next time that record is reused. To assure this, the value number is incremented by deletion_counter * hash_table_size. The deletion_counter 625 shows how many times a Hash Table record is reused after garbage collection. A stack is used to hold entries of Hash Table records that are freed after garbage collection. The original names before the SSA renaming is also hashed. An entry, say x+y, points to a link list that has the text pointers for x0+y0, x1+y0, etc. The variants can be removed at the exit of a loop. Some expressions may evaluate to a text that does not exist. For an example of this, see x1+y0 in Table R. The Hash key, constructed primarily of the opcode and the operands, is stored instead of the text pointer.

Each Hash Table record may contain the following fields:

Text 630 containing the text of an expression;

FakeUse 635 indicating which definition reaches the expression;

VNL 640 holding the Value Number List of an expression;

FakeLHS 645 which is a work field for the construction and renaming of a temporary expression. Interblock temporaries are created at the end when redundancies are found.

Basic block pointer 650;

Statement pointer 655;

Text pointer or constructed Hash Key 660;

Deletion counter 625; and

NextLink 665 which points to the next record for items that have collisions.

A Hash Table dictionary 670 holds an array of value numbers corresponding to each name used. Temporarys 675 are created to hold expressions for redundancy checking. The pointer (p) 680 to the linklist 685 is copied from the Hash Table 600 to the dictionary 670 when the temporary 675 is created.

Referring now to Table P through Table U, various scenarios showing the practice of the present invention are shown. Table P shows the present invention identifying and removing a redundant expression. Table Q and Table R show the present invention identifying and moving a partially redundant expression. Table S shows the present invention identifying and moving a partially redundant expression up one basic block, after which the expression is still partially redundant at the moved location, and after which the expression is moved up one additional basic block. Table T shows a scenario in which the prior art fails to handle redundancies and partial redundancies, but in which the present invention identifies and moves a partial redundancy, and further identifies and removes a redundancy. Table U shows the application of the present invention to a sample program from the prior art, Rosen et al.

TABLE P

An example identifying and removing a redundant expression a. Input in SSA form: ==> b. Assign value number ==>

|  |  | Value Number |
|---|---|---|
| = x0 + y0 | = x0 + y0 | 9 |
| do i = 1,10 | do i = 1,10 |  |
|   x1 = φ(x0,x2) |   x1 = φ(x0,x2) | 10,11 |
|   = x1 + y0 |   = x1 + y0 | 9,12 |
|   x2 = |   x2 = | 11 |
|   = x2 + y0 |   = x2 + y0 | 12 |
| end | end |  | c. Insert φ-functions for ==> d. Rename variables ==> expressions in same value
number set {9,12}

| | |
|---|---|
| = t | = t0 |
| t = x0 + y0 | t1 = x0 + y0 |
| do i = 1,10 | do i = 1,10 |
|   t = φ(t,t) |   t2 = φ(t1,t4) |
|   x1 = φ(x0,x2) |   x1 = φ(x0,x2) |
|   = t |   = t2 |
|   t = x1 + y0 |   t3 = x1 + y0 |
|   x2 = |   x2 = |
|   = t |   = t3 |
|   t = x2 + y0 |   t4 = x2 + y0 |
| end | end | e. Determines full and ==> f. Clean up links partial redundancy

| | | |
|---|---|---|
| = t0 |  | ! removed |
| t2 = x0 + y0 | t1 = x0 + y0 |  |
| do i = 1,10 | do i = 1,10 |  |
|   t2 = φ(t1,t4) |   t2 = φ(t1,t4) |  |
|   x1 = φ(x0,x2) |   x1 = φ(x0,x2) |  |
|   = t2 |  |  |
|   t3 = x1 + y0   ! Redundant |   = t2 |  |
|   x2 = |   x2 = |  |
|   = t3 |  |  |
|   t4 = x2 + y0 |   t4 = x2 + y0 |  |
| end | end |  |

TABLE Q

An example identifying and moving a partially redundant expression a. Input in SSA form: ==> b. Assign value number ==>

|  |  | Value Number |
|---|---|---|
| do i = 1,10 | do i = 1,10 |  |
|   x1 = φ(x0,x2) |   x1 = φ(x0,x2) | 10,11 |
|   = x1 + y0 |   = x1 + y0 | 9,12 |
|   x2 = |   x2 = | 11 |
|   = x2 + y0 |   = x2 + y0 | 12 |

TABLE Q-continued

An example identifying and moving a partially redundant expression c. Insert φ-fcns for ==>  
expressions in same value number set {9,12}

```
    do i = 1,10
        t = φ(t,t)
        x1 = φ(x0,x2)
        = t
        t = x1 + y0
        x2 =
        = t
        t = x2 + y0
    end
``` d. Rename variables ==>

```
    do i = 1,10
        t2 = φ(t1,t4)
        x1 = φ(x0,x2)
        =t2
        t3 = x1 + y0
        x2 =
        = t3
        t4 = x2 + y0
    end
``` e. Determines full and ==>  
partial redundancy

```
    do i = 1,10
        t2 = φ(t1,t4)
        x1 = φ(x0,x2)
        = t2
        t3= x1 + y0   ! Partial Redundancy
        x2 =
        = t3
        t4= x2 + y0
    end
``` f. Clean up links

```
    t5 = x1 + y0
    do i = 1,10
        t2 = φ(t5,t4)
        x1 = φ(x0,x2)
        = t2
        x2 =
        t4 = x2 + y0
    end
```

TABLE R

An example identifying and moving a partially redundant expression a. input in SSA form: ==>

```
x0 + y0\      /x0 + y0
               x1 = 3
        \    /
         \  /
        x2 = φ(x0, x1)
        = x2 + y0
``` b. Assign value number ==>

| | Value Number |
|---|---|
| x0 + y0 \ / x0 + y0 | 10, 10 |
| x1 = 3 | 11 |
| x2 = φ(x0, x1) | 9, 11 |
| = x2 + y0 | 10, 12 |
| {x0 + y0, x1 + y0} | | c. Insert φ-fcns for ==>  
expressions in same value number set {10, 12}

```
= t; t =         = t; t =
x0 + y0\        /x0 + y0
                 x1 = 3
        \      /
         \    /
        x2 = φ(x0, x1)
        t = φ(t, t)
        = x2 + y0
``` d. Rename variables ==>

```
t1 =             t2 =
x0 + y0\        /x0 + y0
                 x1 = 3
        \      /
        x2 = φ(x0, x1)
        t3 = φ(t1, t2)
        = x2 + y0
``` e. Determines full and ==>  
partial redundancy

```
t1 =             t2 =
x0 + y0\        /x0 + y0
                 x1 = 3
        \      /
        x2 = φ(x0, x1)
        t3 = φ(t1, t2)
        = x2 + y0
``` x2 + y0 is not redundant since

TABLE R-continued

An example identifying and moving a partially redundant expression only value number 10 reaches it.  
x2 + y0 has value numbers 10 and 12  
and therefore it is partially redundant.

f. Move code up.

```
t2 = x0 + y0
t1 = x0 + y0\    /x1 = 3
              \  /t4 = x1 + y0
        x2 = φ(x0, x1)
        t3 = φ(t1, t4)
        = t4
```

TABLE S

An example identifying and moving a partially redundant expression up one basic block, after which the expression is still partially redundant at the moved location, and after which the expression is moved up one additional basic block a. input in SSA form: ==>

```
        \   /x0 + y0
         \ /
         /x0 + y0
        /
       x0 + y0
``` b. Assign value number ==>

| | Value Number |
|---|---|
| x0 + y0 | 10 |
| x0 + y0 | 10 |
| x0 + y0 | 10 | c. Insert φ-fcns for ==>  
expressions in same value number set {10}

```
         t =
        /x0 + y0
t =    /        = t; t =
φ(t, t)\        /x0 + y0
       t = φ(t, t)
       x0 + y0
``` d. Rename variables ==>

```
         t1 =
        /x0 + y0
t2 =   /        = t; t3 =
φ(t0, t1)\      /x0 + y0
       t4 = φ(t2, t3)
       = t4; t5 = x0 + y0
```

TABLE S-continued

An example identifying and moving a partially redundant expression up one basic block, after which the expression is still partially redundant at the moved location, and after which the expression is moved up one additional basic block e. Determines full and partial redundancy  ==>  f. Shuffles t5 = x0 + y0 up one block  ==>

```
         t1 =
         x0 + y0
    /         \
t2 =           = t; t3 =
φ(t0, t1)       x0 + y0
    \         /
    t4 = φ(t2, t3)
    = t4; t5 = x0 + y0
    !Partially redundant
```

```
         t1 =
         x0 + y0
    /         \
t2 =           t3 =
φ(t0, t1)       x0 + y0
t6 = x0 + y0
    \         /
    t4 = φ(t6, t3)
    = t4
``` g. It is determined from the φ-function which dominates t6 that t6 is still partially redundant; moves t6 one more block up.

```
t7 =            t1 =
x0 + y0         x0 + y0
    \          /
t2 =           t3 =
φ(t7, t1)       x0 + y0
    \          /
    t4 = φ(t2, t3)
    = t4
```

TABLE T

An example in which the prior art fails to handle redundancies and partial redundancies, but in which the present invention identifies and moves a partial redundancy, and further identifies and removes a redundancy a. Input in SSA form:  ==>  b. Assign value number  ==>

|  |  | Value Number |
|---|---|---|
| = a0 * b0 | = a0 * b0 | 10 |
| = c0 * b0 | = c0 * b0 | 11 |
| if ( ) a1 = c0 | if ( ) a1 = c0 | 12 |
| a2 = φ(a0,a1) | a2 = φ(a0,a1) | 9,12 |
| = a2 * b0 | = a2 * b0 | 10,11 | c. Insert φ-fcns for expressions in same value number set {10,11}  ==>  d. Rename variables  ==>

|  |  |  |
|---|---|---|
| t = a0 * b0 | t1 = a0 * b0 | 10 |
| t = c0 * b0 | t2 = c0 * b0 | 11 |
| if ( ) a1 = c0 | if ( ) a1 = c0 | 12 |
| a2 = φ(a0,a1) | a2 = φ(a0,a1) | 9,12 |
| = t | = t2 |  |
| t = a2 * b0 | t3 = a2 * b0 | 10,11 | e. Determines full and partial redundancy  ==>  f. Move code up  ==>

```
t1 = a0 * b0
t2 = c0 * b0
if ( ) a1 = c0 a2 = φ(a0,a1)
= t2
t3 = a2 * b0 ! Partially redundant
```

```
= a0 * b0
t2 = c0 * b0
if ( ) a1 = c0
    else t3 = a0 * b0  ! redundant
a2 = φ(a0,a1)
t4 = φ(t3,t2)
= t4
``` g. Checks redundancy for moved code

```
q1 = a0 * b0
t2 = c0 * b0
if ( ) a1 = c0
    else t3 = q1
a2 = φ(a0,a1)
t4 = φ(t3,t2)
= t4
```

Notice that a different temp (q) is created in the last step.

TABLE U

The sample program of Rosen et al.

a. Source program
Invariants are identified, and uses that are upwardly exposed in a loop are treated as variants.

|  | Invariants |
|---|---|
| do forever | |
|     if ( ) { L = C * B | yes |
|         M = L + 4 | no |
|         A = C } | no |
|     else { D = C | yes |
|         L = D * B | yes |
|         S = A * B | no |
|         T = S + 1 } | no |
|     X = A * B | no |
|     Y = X + 1 | no |
| enddo | | b. Input in SSA form

```
do forever
    A2 = φ(A1,A4)
    D2 = φ(D1,D4)
    L2 = φ(L1,L5)
    M2 = φ(M1,M4)
    S2 = φ(S1,S4)
    T2 = φ(T1,T4)
    if ( ) { L3 = C1 * B1
        M3 = L3 + 4
        A3 = C1}
    else { D3 = C1
        L4 = D3 * B1
        S3 = A2 * B1
        T3 = S3 + 1 }
    A4 = φ(A3,A2)
    D4 = φ(D2,D3)
    L5 = φ(L3,L4)
    M4 = φ(M3,M2)
    S4 = φ(S2,S3)
    T4 = φ(T2,T3)
    X1 = A4 * B1
    Y1 = X1 + 1
enddo
``` c. Assign value numbers

| do forever | Value Numbers | |
|---|---|---|
| A2 = φ(A1,A4) | 14 = 1,15 | |
| D2 = φ(D1,D4) | 19 = 4,18 | |
| L2 = φ(L1,L5) | (5,10) | |
| M2 = φ(M1,M4) | 13 = 6,14 | |
| S2 = φ(S1,S4) | 21 = 7,22 | |
| T2 = φ(T1,T4) | 23 = 8,25 | |
| if ( ) { L3 = C1 * B1 | 10 = 3*2 | *1 |
|     M3 = L3 + 4 | 11 = 10*94 | |
|     A3 = C1} | 3 = 3 | |
| else { D3 = C1 | 3 = 3 | |
|     L4 = D3 * B1 | 10 = 3*2 | *1 |
|     S3 = A2 * B1 | 20 = 14*2 | |
|     T3 = S3 + 1 } | 24 = 20+91 | |
| A4 = φ(A3,A2) | 15 = 3,14 | |
| D4 = φ(D2,D3) | 18 = 19,3 | |
| L5 = φ(L3,L4) | 10 = 10,10 | |
| M4 = φ(M3,M2) | 14 = 11,13 | |
| S4 = φ(S2,S3) | 22 = 21,20 | |
| T4 = φ(T2,T3) | 25 = 23,24 | |
| X1 = A4 * B1 | 16 = 15*2 | |
| Y1 = X1 + 1 | 17 = +91 | |
| enddo | | |

Note: the partial redundancy for X1 and Y1 will not be attempted to be discovered here (at least initially) because A is modified. If A is not modified in the loop, then it could be found here. All the φ-functions here, except that of L, are involved in a recursive definitions. Unique values are assigned to the target.

d. Insert φ-functions for expressions in same value number set & rename variables

TABLE U-continued

The sample program of Rosen et al.

```
do forever
    A2 = φ(A1,A4)
    D2 = φ(D1,D4)
    L2 = φ(L1,L5)
    M2 = φ(M1,M4)
    S2 = φ(S1,S4)
    T2 = φ(T1,T4)
    w1 = φ(w0,w4)
    if ( ) { = w1
        w2 = C1 * B1
        L3 = w2                10
        M3 = L3 + 4
        A3 = C1}
    else { D3 = C1
        = w1
        w3 = D3 * B1           10
        L4 = w3
        S3 = A2 * B1
        T3 = S3 + 1 }
    A4 = φ(A3,A2)
    D4 = φ(D2,D3)
    L5 = φ(L3,L4)
    M4 = φ(M3,M2)
    S4 = φ(S2,S3)
    T4 = φ(T2,T3)
    w4 = φ(w2,w3)
    X1 = A4 * B1
    Y1 = X1 + 1
enddo
``` e. Determines redundancy (RD) and partial redundancy (PR)

| do forever | |
|---|---|
| A2 = φ(A1,A4) | |
| D2 = φ(D1,D4) | |
| L2 = φ(L1,L5) | |
| M2 = φ(M1,M4) | |
| S2 = φ(S1,S4) | |
| T2 = φ(T1,T4) | |
| w1 = φ(w0,w4) | |
| if ( ) { = w1 | |
|     w2 = C1 * B1 | PR |
|     L3 = w2 | PR value number = 10 |
|     M3 = L3 + 4 | PR |
|     A3 = C1} | |
| else { D3 = C1 | PR |
|     = w1 | |
|     w3 = D3 * B1 | PR |
|     L4 = w3 | PR value number = 10 |
|     S3 = A2 * B1 | |
|     T3 = S3 + 1 } | |
| A4 = φ(A3,A2) | |
| D4 = φ(D2,D3) | |
| L5 = φ(L3,L4) | |
| M4 = φ(M3,M2) | |
| S4 = φ(S2,S3) | |
| T4 = φ(T2,T3) | |
| w4 = φ(w2,w3) | |
| X1 = A4 * B1 | |
| Y1 = X1 + 1 | |
| enddo | | f. Moves invariants or partial redundancy up. Remove spurious φ-functions.

```
L3 = C1 * Bl
do forever
    A2 = φ(A1,A4)
    D2 = φ(D1,D4)
    L2 = φ(L1,L5) => L2 = φ(L1,L3) =>
    L2 = φ(L3,L3) => nothing
    M2 = φ(M1,M4)
    S2 = φ(S1,S4)
    T2 = φ(T1,T4)
    w1 = φ(w0,w4)
    if ( ) {
        M3 = L3 + 4            PR
        A3 = C1}
    else { D3 = C1             PR
```

TABLE U-continued

The sample program of Rosen et al.

```
        S3 = A2 * B1
        T3 = S3 + 1 }
    A4 = φ(A3,A2)
    D4 = φ(D2,D3)
                        L3 = φ(L3,L3) removed
                        after substitution
    M4 = φ(M3,M2)
    S4 = φ(S2,S3)
    T4 = φ(T2,T3)
    w4 = φ(w2,w3)
    X1 = A4 * B1
    Y1 = X1 + 1
enddo
```
The other two partial redundancies, M3 & D3, cannot be moved due to safe conditions - it is not anticapable in all paths.

Figure 10:
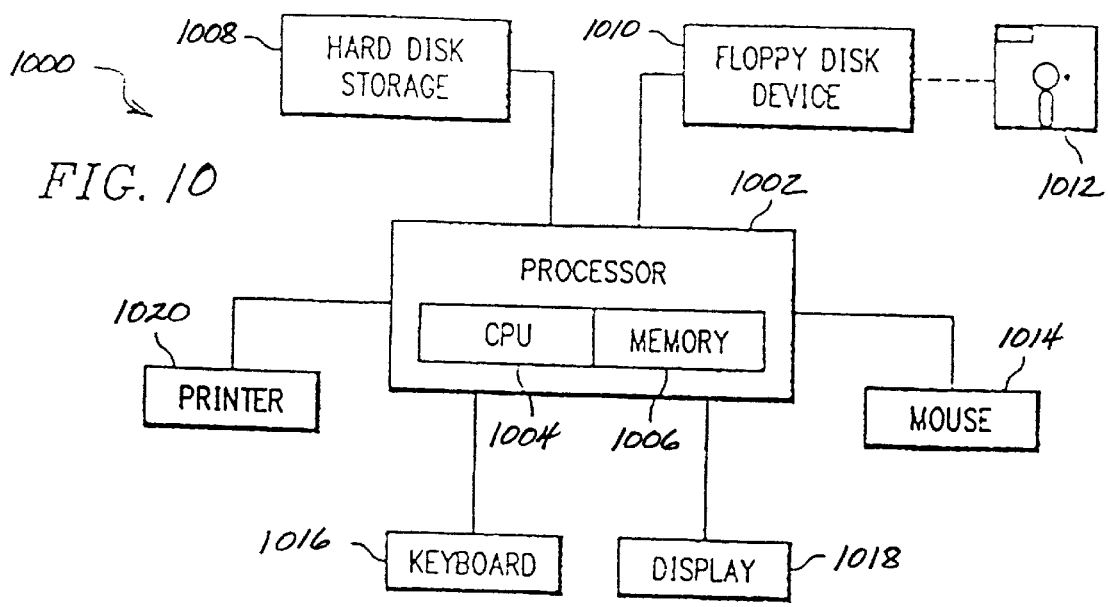
FIG. 10 is a block diagram of a computer system used in performing the method of the present invention, forming part of the apparatus of the present invention, and which may use the article of manufacture comprising a computer-readable storage medium having a computer program embodied in said medium which may cause the computer system to practice the present invention.

Referring now to FIG. 10, a block diagram illustrates a computer system 1000 used in performing the method of the present invention, forming part of the apparatus of the present invention, and which may use the article of manufacture comprising a computer-readable storage medium having a computer program embodied in said medium which may cause the computer system to practice the present invention. The computer system 1000 includes a processor 1002, which includes a central processing unit (CPU) 1004, and a memory 1006. Additional memory, in the form of a hard disk file storage 1008 and a computer-readable storage device 1010, is connected to the processor 1002. Computer-readable storage device 1010 receives a computer-readable storage medium 1012 having a computer program embodied in said medium which may cause the computer system to implement the present invention in the computer system 1000. The computer system 1000 includes user interface hardware, including a mouse 1014 and a keyboard 1016 for allowing user input to the processor 1002 and a display 1018 for presenting visual data to the user. The computer system may also include a printer 1020.

Although the present invention has been particularly shown and described with reference to a preferred embodiment, it will be understood by those skilled in the art that various changes in form and detail may be made without departing from the spirit and the scope of the invention.

I claim:

1. A method of optimizing a computer program by performing code motion and code redundancy removal, said method comprising the steps of:
    identifying an expression as a partially redundant expression using extended global value numbering, before moving the identified partially redundant expression;
    moving the partially redundant expression to a location in a basic block preceding a definition of a phi-function of the partially redundant expression, said moving of the partially redundant expression being performed:
        if the partially redundant expression dominates a source operand of the phi-function of the partially redundant expression, said domination meaning that the partially redundant expression comes before the source operand on all paths through the computer program, and
        if a phi-function below the partially redundant expression has all source operands receiving the same value number;
    determining if the moved partially redundant expression is still partially redundant in the location; and
    repeating the moving step and determining step until the expression is not partially redundant.

2. The method of claim 1 wherein the identifying step further comprises the step of:
    identifying the expression as a partially redundant expression if a value number list associated with the expression and a value number list associated with another expression both contain a common value number, wherein each of the value number lists comprises an ordered list of value numbers assigned to the expression associated with the value number list.

3. The method of claim 1 wherein the identifying step further comprises the step of:
    identifying the expression as a fully redundant expression if a value number list associated with the expression and a value number list associated with another expression are identical, wherein each of the value number lists comprises an ordered list of value numbers assigned to the expression associated with the value number list; and
    deleting the fully redundant expression.

4. A computer system for optimizing a computer program by performing code motion and code redundancy removal, said computer system comprising:
    means for identifying an expression as a partially redundant expression using extended global value numbering, before moving the identified partially redundant expression;
    means for moving the partially redundant expression to a location in a basic block preceding a definition of a phi-function of the partially redundant expression, said moving of the partially redundant expression being performed:
        if the partially redundant expression dominates a source operand of the phi-function of the partially redundant expression, said domination meaning that the partially redundant expression comes before the source operand on all paths through the computer program, and
        if a phi-function below the partially redundant expression has all source operands receiving the same value number;
    means for determining if the partially redundant expression is still partially redundant in the location; and
    means for repeating the moving and determining until the expression is not partially redundant.

5. The computer system of claim 4 wherein the identifying means further comprises:
    means for identifying the expression as a partially redundant expression if a value number list associated with the expression and a value number list associated with another expression both contain a common value number, wherein each of the value number lists comprises an ordered list of value numbers assigned to the expression associated with the value number list.

6. The computer system of claim 4 wherein the identifying means further comprises:
    means for identifying the expression as a fully redundant expression if a value number list associated with the expression and a value number list associated with another expression are identical, wherein each of the value number lists comprises an ordered list of value numbers assigned to the expression associated with the value number list; and
    means for deleting the fully redundant expression.

7. An article of manufacture for use in a computer system for optimizing a computer program by performing code motion and code redundancy removal, said article of manufacture comprising a computer-readable storage medium having a computer program embodied in said medium which may cause the computer system to:

identify an expression as a partially redundant expression using extended global value numbering, before moving the identified partially redundant expression;

move the partially redundant expression to a location in a basic block preceding a definition of a phi-function of the partially redundant expression, said moving of the partially redundant expression being performed:

if the partially redundant expression dominates a source operand of the phi-function of the partially redundant expression, said domination meaning that the partially redundant expression comes before the source operand on all paths through the computer program, and if a phi-function below the partially redundant expression has all source operands receiving the same value number;

determine if the partially redundant expression is still partially redundant in the location; and repeat the moving and determining until the expression is not partially redundant.

8. The article of manufacture of claim 7 wherein the identifying may further cause the computer system to:

identify the expression as a partially redundant expression if a value number list associated with the expression and a value number list associated with another expression both contain a common value number, wherein each of the value number lists comprises an ordered list of value numbers assigned to the expression associated with the value number list.

9. The article of manufacture of claim 7 wherein the identifying may further cause the computer system to:

identify the expression as a fully redundant expression if a value number list associated with the expression and a value number list associated with another expression are identical, wherein each of the value number lists comprises an ordered list of value numbers assigned to the expression associated with the value number list; and delete the fully redundant expression.

\* \* \* \* \*

UNITED STATES PATENT AND TRADEMARK OFFICE
CERTIFICATE OF CORRECTION

PATENT NO. : 6,077,314
DATED : June 20, 2000
INVENTOR(S) : John Shek-Luen Ng

It is certified that error appears in the above-identified patent and that said Letters Patent is hereby corrected as shown below:

<u>Title page,</u>
Item [56], References Cited, U.S. PATENT DOCUMENTS, please add:
-- 4,802,091   1/1989   Cocke et al.
   5,659,754   3/1995   Grove et al. --
After "J. Choi, R. Cytron, Jr. Ferrnate," "Efficientl" should read -- Efficient --.

Signed and Sealed this

Twenty-fifth Day of June, 2002

*Attest:*

*Attesting Officer*

JAMES E. ROGAN
*Director of the United States Patent and Trademark Office*